April 29, 1958 G. F. ROGERS 2,832,822
KINESCOPE COUPLING AND CONTROL CIRCUITS
Filed April 27, 1955
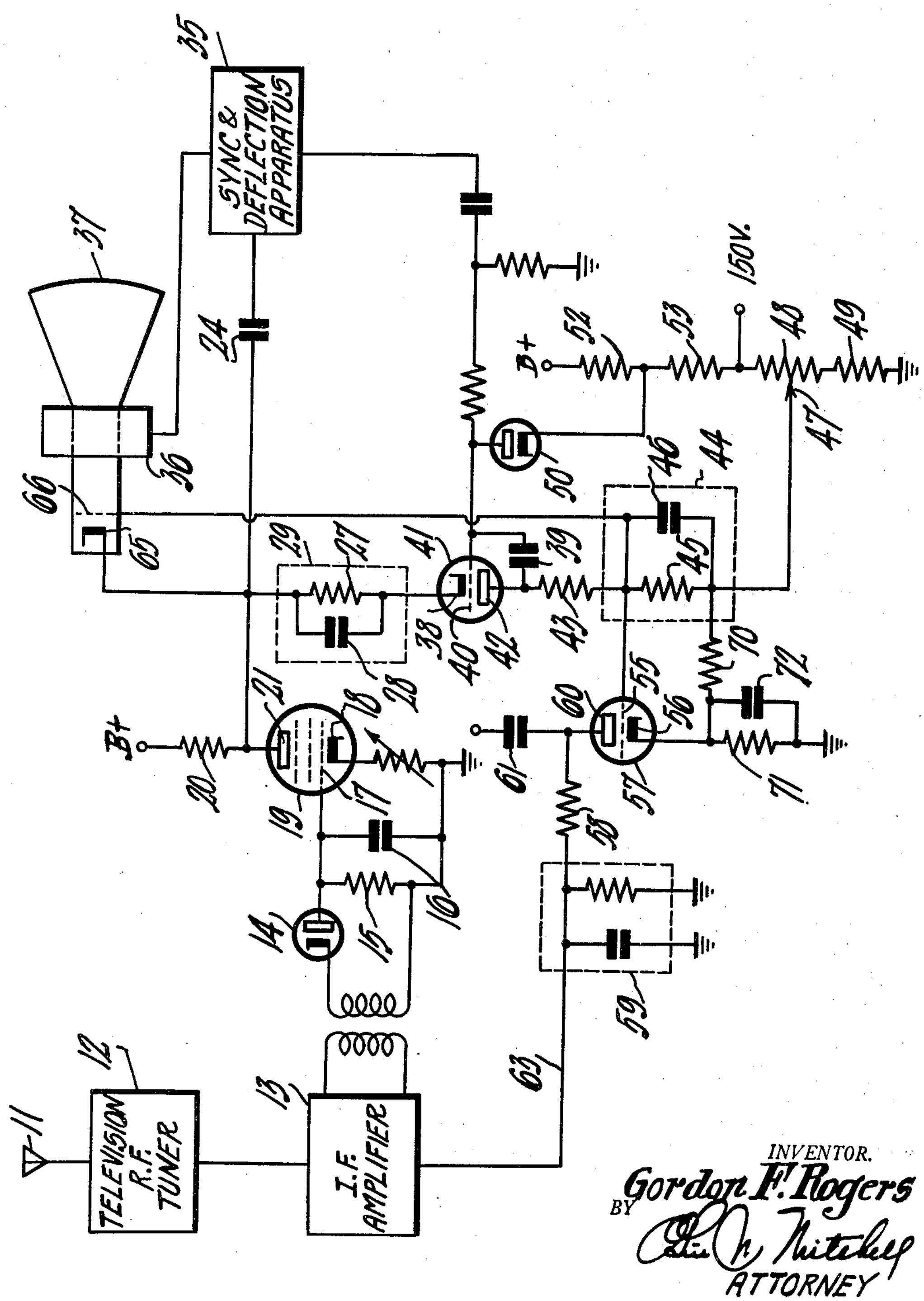
INVENTOR.
Gordon F. Rogers
BY
ATTORNEY United States Patent Office 2,832,822

Patented Apr. 29, 1958

2,832,822

KINESCOPE COUPLING AND CONTROL CIRCUITS

Gordon F. Rogers, Lincolnwood, Ill., assignor to Radio Corporation of America, a corporation of Delaware Application April 27, 1955, Serial No. 504,259

The terminal fifteen years of the term of the patent to be granted has been disclaimed 3 Claims. (Cl. 78—7.5)

The present invention relates generally to television image signal translating circuits and particularly to improved kinescope coupling and control circuits.

A television receiving system may utilize either a direct coupled video signal amplifier system or an A.-C. coupled video amplifier system to interconnect the video detector stage with the image reproducing device or kinescope. The use of an A.-C. coupled video signal amplifier system may require some form of D.-C. restoration. In a direct coupled video signal amplifier system, the D.-C. component is derived from the carrier wave envelope at the output of the second detector thereby avoiding the cost and necessity of a D.-C. restorer. Moreover, coupling capacitors between the video signal amplifier stages are eliminated and the recovery time of these stages from overload due to high amplitude noise pulses is facilitated.

It is an object of the present invention to provide an improved kinescope coupling and control circuit which operates relative to the black level of the received video signal and wherein the disadvantage of white picture with zero signal level input is avoided.

It is another object of the present invention to provide an improved noise immune kinescope coupling and control circuit which operates independently of the amplitude of received synchronizing pulses.

In accordance with the present invention, use is made of the fact that the television signal level is independent of video modulation during the blanking interval and of the fact that noise in general adds to the signal and does not subtract from it. A reference voltage is obtained by detecting the minimum instead of the maximum of a signal during the blanking interval. This voltage is utilized as the reference voltage for the control electrodes of the kinescope; and each of the control electrodes is referenced with respect to signal ground in accordance with the video signal blanking amplitude to provide a constant voltage therebetween during the blanking interval.

In accordance with another aspect of the present invention, the reference voltage may be manually adjusted to establish a brightness control for the television receiving system.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which the single figure is a schematic circuit diagram, partly in block form, of the image signal handling portions of a television receiving system embodying the present invention.

Referring now to the drawing, a conventional antenna system 11, television radio frequency (R.-F.) tuner 12 and intermediate frequency (I.-F.) signal amplifier stages 13 are connected in cascade to receive, select and amplify television signals and apply them to the second detector or video detector portion of the receiving system which includes a unidirectionally conducting device illustrated as a diode 14. Accordingly, the received signal is demodulated by the video detector stage to provide a sync negative signal across the load elements 15 and 16 of the diode 14.

The signal which is derived from across the load elements 15 and 16 is applied to the control electrodes 17 and 18 of an electron discharge device 19 utilized as a video signal amplifier. A sync positive signal representing an amplified replica of the input signal is therefore derived across a load impedance element illustrated as a resistor 20, connected between the positive terminal B+ of a source of direct current energizing potential and the anode 21 of the electron discharge device 19.

In order to derive the synchronizing information from the composite video signal, the anode or output terminal of the video signal amplifier tube 19 is connected through a capacitor 24 to the sync and deflection apparatus 35.

The output of the synchronizing and deflection apparatus 35 is applied to the deflection yokes 36 of an image reproducing device, illustrated as a kinescope 37, in order to deflect the kinescope beam in two directions normal to each other to provide a rectangular scan on the face of the kinescope.

In accordance with the present invention, pulses at the horizontal scanning rate may be derived from the synchronizing and deflection apparatus 35 and applied to the control electrode 40 of an electron discharge device 41 utilized as a keyed reference voltage tube. The cathode 38 of the keyed reference voltage tube is connected to the anode 21 of the video signal amplifier tube 19 through a time constant network 29 consisting of the parallel arrangement of a resistor 27 and a capacitor 28.

A D.-C. voltage is applied to the anode 42 of the keyed reference voltage tube through the series arrangement of an impedance, illustrated as a resistor 43, and a second time constant network 44 comprising a resistor 45 and a capacitor 46 which are connected in parallel. The D.-C. voltage available for the anode 42 of the reference tube 41 may be varied by means of the moveable contact 47 on the potentiometer 48 which is connected in series with a resistor 49 between the positive terminal of a further source of D.-C. potential which, for the purpose of illustration only, is indicated at 150 volts and a point of fixed reference potential such as signal ground.

The pulses which are applied to the control electrode 40 from the synchronizing and deflection apparatus 35 may have an amplitude in the order of 500 volts. In order to maintain the peak amplitude of these pulses at a constant level, a diode clamp 50 is connected between the control grid 40 and the junction of the voltage divider arrangement comprising a pair of resistors 52 and 53 which are connected between the positive terminal B+ of the source of energizing potential and the positive terminal of the 150 volt source.

These pulses are also applied to the anode 42 of the reference tube 41 through the capacitor 39 thereby developing across the resistor 43 a D.-C. voltage in accordance with the clamped level of the keying pulses. This voltage effectively raises the anode 42 to a voltage level equal to that of the control grid 40. However, the operating voltage available for the anode 42 is the sum of the D.-C. voltage due to the keying pulses and the voltage between the moveable contact 47 on the potentiometer 48 and signal ground. Accordingly, the anode 42 is maintained at a voltage above that of the control grid 40 as determined by the adjustment of the moveable contact 47.

Automatic gain control voltages may be derived across the time constant network 44 and applied between the control grid 55 and the cathode 56 of an electron discharge device 57 utilized as an AGC amplifier tube. Accordingly, amplified automatic gain control voltages are developed in the anode circuit comprising a resistor 58 and a filter network 59 when pulses, which may be obtained from the deflection apparatus 35, are applied to the anode 60 through a coupling capacitor 61.

As will be seen hereinafter, these AGC voltages are derived as a function of the received carrier wave amplitude and are supplied to the intermediate frequency amplifier stages 13 by means of the AGC bus 63.

The kinescope control electrodes such as the cathode 65 and the control grid 66, which it is to be understood form only a part of the electron beam generating system of the kinescope 37, are connected respectively to the output terminal or anode 21 of the video signal amplifier tube 19 and the junction of the resistor 43 and the time constant network 44. It will now be seen that in accordance with the present invention, a constant voltage during the blanking interval of a received television signal is provided between these control electrodes. It will further be seen that this constant voltage may be adjusted to provide a black picture upon a zero signal condition and that this constant voltage appertains at all signal levels.

The amplified video signal is applied to the cathode 38 of the reference tube 41 and conduction of the reference tube 41 may be affected upon the condition that the amplitude of the keying pulses from the deflection apparatus 35 is such as to bias the reference tube into a conducting region. The extent of this conduction will, of course, depend upon the relative amplitudes of the video signal and the keying pulses in combination with the value of the anode voltage. The keying pulse amplitude is accordingly, clamped to a predetermined maximum level by the action of diode 50 in order to establish a reference level for conduction and provide an amount of conduction through the reference tube depending on the difference in amplitude between the signal during the blanking interval and the value of the reference voltage for the diode clamp.

Since the resistors 27 and 45 are each connected in such a manner to be traversed by the anode-cathode current of the voltage reference tube 41, and if they are selected to have equal values, equal voltages are developed across each. The magnitude of the voltage thus developed is moreover determined by the difference between the amplitude of the video signal during the blanking interval and the value of the D.-C. reference voltage applied to cathode 51 of diode clamp 50.

Accordingly, the voltage applied to the control grid 66 is varied with respect to ground by an amount which is equal to the variation in the voltage at the cathode 65 produced by the action of the video amplifier tube 19. In view of this, it is seen that regardless of the video signal amplitude, a constant voltage during blanking interval is applied between the cathode 65 and the control electrode or grid 66 of the kinescope 37.

In accordance with the second aspect of the present invention, however, the magnitude of this voltage may be adjusted by means of the potentiometer 48 to thus provide a brightness control for the kinescope 37.

The video signal level appearing at the output terminals of the video signal amplifier tube 19 is determined by the bias reference level which in turn is determined by the static bias applied to the cathode 56 of the AGC amplifier tube 57. This static bias is accomplished by means of a voltage divider arrangement comprising a resistor 70 and the parallel arrangement of a cathode resistor 71 and a cathode bypass capacitor 72 connected in series between the movable contact 47 of the brightness control and signal ground. The resistance of the resistors 70 and 71 are chosen so that the voltage developed across the resistor 70 is small with respect to that developed across the resistor 71. This is necessary to insure that a change in the brightness control will not provide a concomitant change in contrast.

A constant voltage is utilized as the static bias for the AGC amplifier tube 57 between the control grid 55 and the cathode 56. The voltage divider arrangement provides a small bias voltage variation even with large voltage variations with respect to ground due to the brightness control adjustment since it was above stated that the resistance of the resistor 70 should be small with respect to that of the resistor 71.

With this condition met, variations in the brightness control voltage will provide only a small percentage change in the voltage across the resistor 70 thereby providing a small change in the AGC operation and thus a small change in contrast.

The voltage developed across the resistor 71 due to the cathode current of the AGC amplifier tube 57 should be small compared with the developed voltage across the resistor 71 due to the current through the voltage divider network. This is easily accomplished in view of the fact that the average current through the AGC amplifier tube 57 to develop an automatic gain control bias in the order of 10 volts may be in the order of only 0.1 milliampere.

Accordingly, there is provided a kinescope coupling and control circuit wherein direct coupled video signal amplifier stages may be utilized to connect the video detector with the kinescope of a television receiving system without the disadvantage of a white picture with a zero signal input level and wherein the brightness may be readily and efficiently controlled with minimum of circuit components.

Having thus described the present invention, what is claimed is:

1. In a television signal receiving system adapted to receive a signal having a recurrent pulse component representing black level in the reproduced image and having an image-display device comprising control elements of at least a cathode and a control grid: a source of said signal; a signal amplifier for amplifying said signal, having an input terminal directly connected to said signal source and an output terminal directly connected to one of said image-display device control elements; a first parallel RC network having a long time constant with respect to the repetition rate of said recurrent pulse component; a current-control tube comprising at least an anode, cathode, and control grid; an isolating resistor; a second parallel RC network having a time constant similar to that of said first RC network; a source of direct voltage of predetermined level; means to connect said first RC network between the cathode of said current-control tube and said amplifier output terminal; means to connect said isolating resistor between the anode of said current-control tube and one end of said second RC network; means to connect the other end of said second RC network to said source of direct voltage; means for applying positive-going keying pulses of reference potential to both anode and control-grid of said control tube in synchronism with said recurrent pulse component thereby to cause conduction in said control-tube during the occurrence of said recurrent pulse component; the magnitude of said conduction being proportional to the magnitude of the difference between said reference potential and the minimum amplitude of said recurrent pulse component at the output terminal of said amplifier whereby a control voltage substantially proportional to said magnitude of conduction is produced at the junction of said isolating resistor and said second RC network; and means connecting the other of said image-display device elements to said junction for applying said control voltage to said other of said two image-display device elements thereby to automatically adjust the black level of said reproduced image during changes in received signal strength.

2. In a television signal receiving system adapted to receive a signal having a recurrent pulse component representing black level in the reproduced image and having an image-display device comprising control elements of at least a cathode and a control grid: a source of said signal; a signal amplifier for amplifying said signal, having an input terminal directly connected to said signal source and an output terminal directly connected to one of said image-display device control elements; a first parallel RC network having a long time constant with respect to the repetition rate of said recurrent pulse component; a current-control tube comprising at least an anode, cathode, and control grid; an isolating resistor; a second parallel RC network having a time constant similar to that of said first RC network; a source of direct voltage of predetermined level; means to connect said first RC network between the cathode of said current-control tube and said amplifier output terminal; means to connect said isolating resistor between the anode of said current-control tube and one end of said second RC network; means to connect the other end of said second RC network to said source of direct voltage; means for applying positive-going keying pulses to both anode and control-grid of said control tube in synchronism with said recurrent pulse component thereby to cause conduction in said control-tube during the occurrence of said recurrent pulse component; means for limiting said keying pulses to a predetermined reference voltage amplitude thereby to cause the magnitude of said conduction to be proportional to the difference between said reference potential and the minimum amplitude of said recurrent pulse component at the output terminal of said amplifier whereby a control voltage substantially proportional to said magnitude of conduction is produced at the junction of said isolating resistor and said second RC network; and means connecting the other of said image-display device elements to said junction for applying said control voltage to said other of said two image-display device elements thereby to automatically adjust the black level of said reproduced image during changes in received signal strength.

3. In a television signal receiving system adapted to receive a signal having a recurrent pulse component representing black level in the reproduced image and having an image-display device comprising control elements of at least a cathode and a control grid: a source of said signal; a signal amplifier for amplifying said signal, having an input terminal directly connected to said signal source and an output terminal directly connected to the cathode of said image-display device, the signal at said output terminal having a polarity in which said recurrent pulse component goes in a positive direction; a first parallel RC network having a long time constant with respect to the repetition rate of said recurrent pulse component; a current-control tube comprising at least an anode, cathode, and control grid; an isolating resistor; a second parallel RC network having a time constant similar to that of said first RC network; a source of direct voltage of predetermined level; means to connect said first RC network between the cathode of said current-control tube and said amplifier output terminal; means to connect said isolating resistor between the anode of said current-control tube and one end of said second RC network; means to connect the other end of said second RC network to said source of direct voltage; means for applying positive-going keying pulses to both anode and control-grid of said control tube in synchronism with said recurrent pulse component thereby to cause conduction in said control-tube during the occurrence of said recurrent pulse component; means for limiting said keying pulses to a predetermined reference voltage amplitude thereby to cause the magnitude of said conduction to be proportional to the magnitude of the difference between said reference potential and the minimum amplitude of said recurrent pulse component at the output terminal of said amplifier whereby a control voltage substantially proportional to said magnitude of conduction is produced at the junction of said isolating resistor and said second RC network; means connecting the control grid of said image-display device to said junction for applying said control voltage to said image-display device control grid thereby to automatically adjust the black level of said reproduced image during changes in received signal strength; and means for adjusting said predetermined level of direct voltage for initially setting the brightness level of said image.

References Cited in the file of this patent

UNITED STATES PATENTS 2,673,892 Richman -------------- Mar. 30, 1954